(12) United States Patent
Tateishi et al.

(10) Patent No.: US 6,501,711 B1
(45) Date of Patent: *Dec. 31, 2002

(54) PICKUP DRIVE APPARATUS, PICKUP DRIVE METHOD, AND RECORDING/REPRODUCING APPARATUS

(75) Inventors: Kiyoshi Tateishi, Saitama (JP); Mitsuru Sato, Saitama (JP); Ikuya Kikuchi, Saitama (JP)

(73) Assignee: Pioneer Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/461,309

(22) Filed: Dec. 15, 1999

(30) Foreign Application Priority Data

Dec. 16, 1998 (JP) .......................................... 10-358031

(51) Int. Cl.$^7$ ................................................. G11B 7/00
(52) U.S. Cl. ................................ 369/44.26; 369/44.29; 369/44.35
(58) Field of Search ........................... 369/44.26, 44.29, 369/44.27, 44.35, 44.25, 53.22, 53.23

(56) References Cited

U.S. PATENT DOCUMENTS 5,508,995 A * 4/1996 Moriya et al. ............ 369/275.3
6,192,009 B1 * 2/2001 Kim ........................ 369/44.25

* cited by examiner

*Primary Examiner*—Thang V. Tran
(74) *Attorney, Agent, or Firm*—Sughrue Mion, PLLC

(57) ABSTRACT

A pickup drive apparatus for recording or reproducing with respect to a recording medium such as a CD and a DVD. In the apparatus, return light produced by irradiating an optical spot is detected by a photodetector, and a push-pull signal is produced from this detection output. A tracking error signal is produced from the push-pull signal by a low-pass filter and a phase compensating circuit. A quasi-ON/OFF control signal having information of an irradiation position of the optical spot is produced from the push-pull signal by a high-pass filter, a comparator, and a single pulse generator. When the quasi-ON/OFF control signal is produced which indicates that the optical spot is positioned on a groove, the tracking error signal is outputted via switching circuits in synchronism with this signal production. A pickup is servo-controlled based on this output signal.

9 Claims, 16 Drawing Sheets

PICKUP DRIVE APPARATUS, PICKUP DRIVE METHOD, AND RECORDING/REPRODUCING APPARATUS

BACKGROUND OF THE INVENTION

1. Field of the Invention

The present invention relates to a pickup drive apparatus and a pickup drive method, which perform either recording operation or reproducing operation with respect to a recording medium such as a CD and a DVD.

2. Description of the Related Art

Conventionally, in a recording/reproducing apparatus for recording/reproducing information on a recording medium (will be referred to as an "optical disk" hereinafter) such as a CD (Compact Disk) and a DVD (Digital Video Disk, or Digital Versatile Disk) with employment of a pickup, a tracking servo control is carried out by using a radial contrast signal by way of a pickup drive apparatus having an arrangement shown in FIG. 15 in order to properly control a position of the pickup along the radial direction.

In FIG. 15, very small spot light "SP" is irradiated from a pickup onto grooves "G" and lands "L", which are alternately positioned along a radial direction "θrd" of an optical disk, and thus, return light such as reflection light produced by this spot irradiation is detected by a photodetector 1.

In the photodetector 1, 4 light receiving units a1, a2, b1, b2 for receiving the above-described return light are provided, detection signals outputted from the respective light receiving units a1, a2, b1, b2 are added to each other by an adder 2, so that an RF signal "$S_{RF}$" is produced. This RF signal $S_{RF}$ is processed by either a low-pass filter or an envelope detecting circuit 3 to thereby produce a radial control signal "$S_{RD}$". Furthermore, the radial control signal $S_{RD}$ is compared with a predetermined threshold value "$V_{REF}$" by a comparator 4, so that a binary ON/OFF track signal "$S_{TR}$" is produced. Then, a tracking servo control is carried out based on the ON/OFF track signal $S_{TR}$ so as to properly control the position of the pickup in the radial direction.

FIG. 16 illustrates a principle idea of this tracking servo control. In this drawing, when the optical spot SP is moved in the same radial direction as while the optical pickup is moved along the radial direction "θrd", intensity of the above-described return light is changed in response to an irradiation position of the optical spot SP, and the amplitude of the radial contrast signal "$S_{RD}$" is changed in connection to this intensity change. When this amplitude change is compared with a predetermined threshold value $V_{REF}$, such an ON/OFF track signal "$S_{TR}$" is produced, the level of which is inverted at a boundary portion between a groove "G" and a land "L". In this ON/OFF track signal $S_{TR}$, a position of a groove G is indicated by a logic level "H", whereas a position of a land L is indicated by a logic level "L".

Then, the irradiation position of the optical spot SP with respect to the groove G corresponding to the recording track is properly controlled by performing the servo control as follows: That is, within a time period Tsink during which the ON/OFF track signal $S_{TR}$ becomes the logic level "H", such a servo control (will be referred to as "track capturing") is carried out in order that the optical pickup is positioned at the center of the groove G. Within a time period Tout during which the ON/OFF track signal $S_{TR}$ becomes the logic level "L", such a servo control (will be referred to as "track escaping") is performed in order that the optical pickup is shunted from the land L.

On the other hand, very recently, write-once type CD-Rs and DVD-Rs into which information can be written only once, as well as CD-RWs and DVD-RWs into which information is rewritable have been developed. However, when the tracking servo control is carried out by employing the above-described conventional pickup drive apparatus with respect to these optical disks, in the case that the above-described optical spot SP is irradiated on such an unrecorded region of the optical disk on which information is not yet recorded, both the radial contrast signal $S_{RD}$ and the ON/OFF track signal $S_{TR}$, which represent the positions of the groove G and the land L, shown in FIG. 16, cannot be obtained. Accordingly, there is such a case that the irradiation position of the optical spot SP with respect to the groove G cannot be properly controlled.

In other words, since the optical reflectivities and the diffraction characteristics with respect to the optical spot are different from each other as to the groove G on which the information is recorded (namely, recorded pit is present), and the land L, it is possible to detect the position of the groove G and the position of the land L as a difference in the respective contrast based upon both the radial contrast signal $S_{RD}$ and the ON/OFF track signal $S_{TR}$, which are obtained from the return light. As a result, the above-described proper servo control can be done. However, as to such a groove G on which no information is recorded (namely, recorded pit is not present) and the land L, when a groove interval is made narrow in order to increase the recording density, there is substantially no difference in the respective contrast. As a consequence, it is not possible to detect the position of the groove G and the position of the land L based upon the radial contrast signal $S_{RD}$ and the ON/OFF track signal $S_{TR}$. There are some cases that the above-described proper servo control cannot be carried out.

As a result, there are some cases that while the optical spot is correctly located with respect to the unrecorded groove G (positioning), the information can be hardly recorded thereon. Also, as known from a so-called "random access operation", when the pickup is moved along the radial direction with respect to the optical disk, the following difficult case may occur. That is, in this random access operation, the servo control can be quickly converged in such a manner that the pickup is moved to a desirable address area, and then the optical spot is positioned to a groove G at this address area.

SUMMARY OF THE INVENTION

The present invention has been made to solve the problems of the above-described conventional apparatus, and therefore, has an object to provide a pickup drive apparatus and a pickup drive method, capable of realizing a highly precise tracking servo control, and also a recording/reproducing apparatus equipped with such a pickup drive apparatus.

To achieve the above-described object, according to an aspect of the present invention, there is provided a pickup drive apparatus for driving/controlling a pickup used to irradiate an optical spot on a recording medium having a pre-pit between tracks, comprising: light detecting means for detecting return light produced by irradiating the optical spot; first signal producing means for producing a tracking error signal based upon the detection output of the light detecting means; second signal producing means for producing a control signal corresponding to the component of the pre-pit based upon the detection output of the light detecting means; control means for performing a tracking control in response to the tracking error signal; and supply means controlled so as to supply the tracking error signal to the control means in response to the control signal.

With employment of the above-described arrangement, the detection output containing the information of the track can be obtained by detecting the return light returned from the recording medium by the light detecting means. The first signal producing means produces the tracking error signal based upon the detection output, and this tracking error signal indicates the irradiation position of the optical spot. The second signal producing means produces a control signal corresponding to the component of the pre-pit based upon this detection output. Then, the supply means supplies the tracking error signal to the control means in response to the control signal so as to servo-control the pickup. As a result, the servo control is carried out in such a manner that the optical spot is positioned.

In particular, since the control signal is not produced based upon the difference between the contrast of the groove and the contrast of the land, which constitutes the problem of the conventional apparatus, but is produced based on the detection component of the pre-pit, such a servo control can be carried out in such a manner that the optical spot can be positioned with respect to the unrecorded groove on which the information is not recorded in high precision.

In other words, in the case that the tracking error signal is supplied to the control means in response to the control signal, when the optical spot is irradiated onto the unrecorded groove, the servo control of "track capturing" is carried out in such a manner that this optical spot is positioned to the groove. When this optical spot is irradiated onto the land, the servo control of "track escaping" is carried out in such a manner that the optical spot is moved from the land to the groove side. As a result, such a servo control is performed in order that the optical spot can be positioned on the groove in high precision.

Also, according to another aspect of the present invention, there is provided a pickup drive method for driving/controlling a pickup used to irradiate an optical spot on a recording medium having a pre-pit between tracks, comprising the steps of: detecting return light produced by irradiating the optical spot; producing a tracking error signal and a control signal corresponding to the component of the pre-pit based upon the detection output of the detecting step; and executing a tracking control by the tracking error signal in response to the control signal.

In accordance with this method, the detection output having the information of the track is obtained by detecting the return light returned from the recording medium. Based on this detection output, the tracking error signal indicative of the irradiation position of the optical spot is produced. Also, based on this detection output, the control signal is produced which is synthesized with the component of the pre-pit. Then, the servo control is carried out based on the tracking error signal in response to the control signal. As a consequence, the servo control is performed in such a manner that the optical spot is positioned to the groove.

Also, when a recording/reproducing apparatus according to another aspect of the present invention is arranged by employing the above-described pickup drive apparatus, it is possible to realize such a recording/reproducing apparatus capable of performing the above-described tracking servo in high precision.

DETAILED DESCRIPTION OF THE PREFERRED EMBODIMENT

Figure 2:
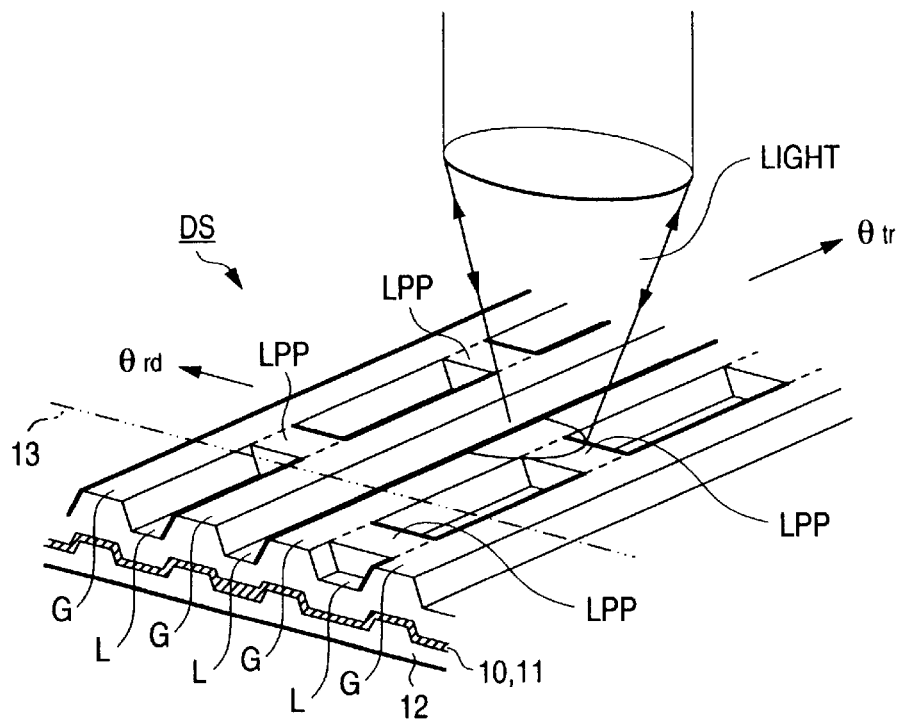
FIG. 2(a) is a perspective view showing a structure of a recording medium having a land pre-pit.
FIG. 2(b) is a cross-sectional view showing the same.
Figure 2:
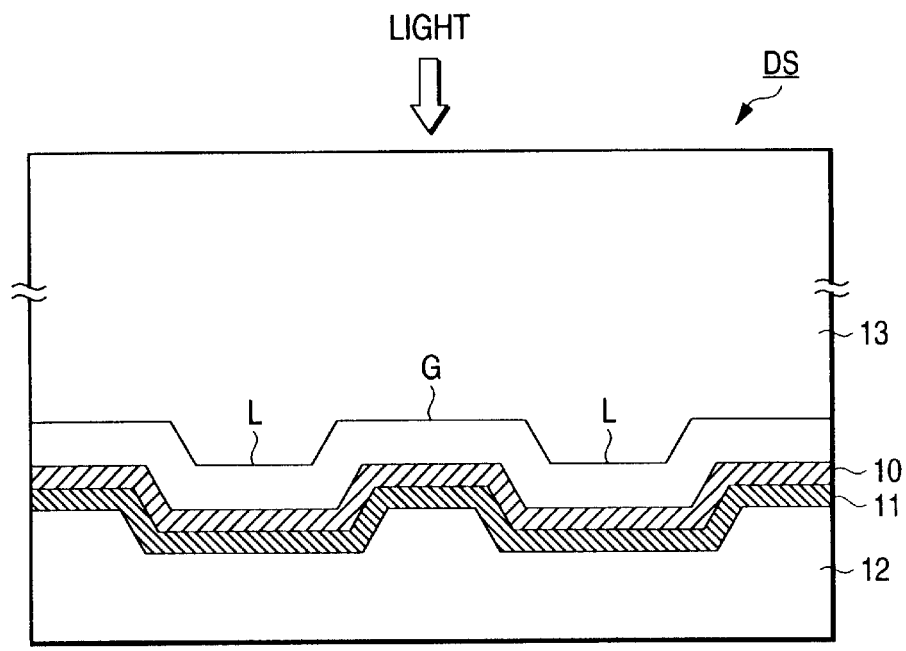
Figure 3:
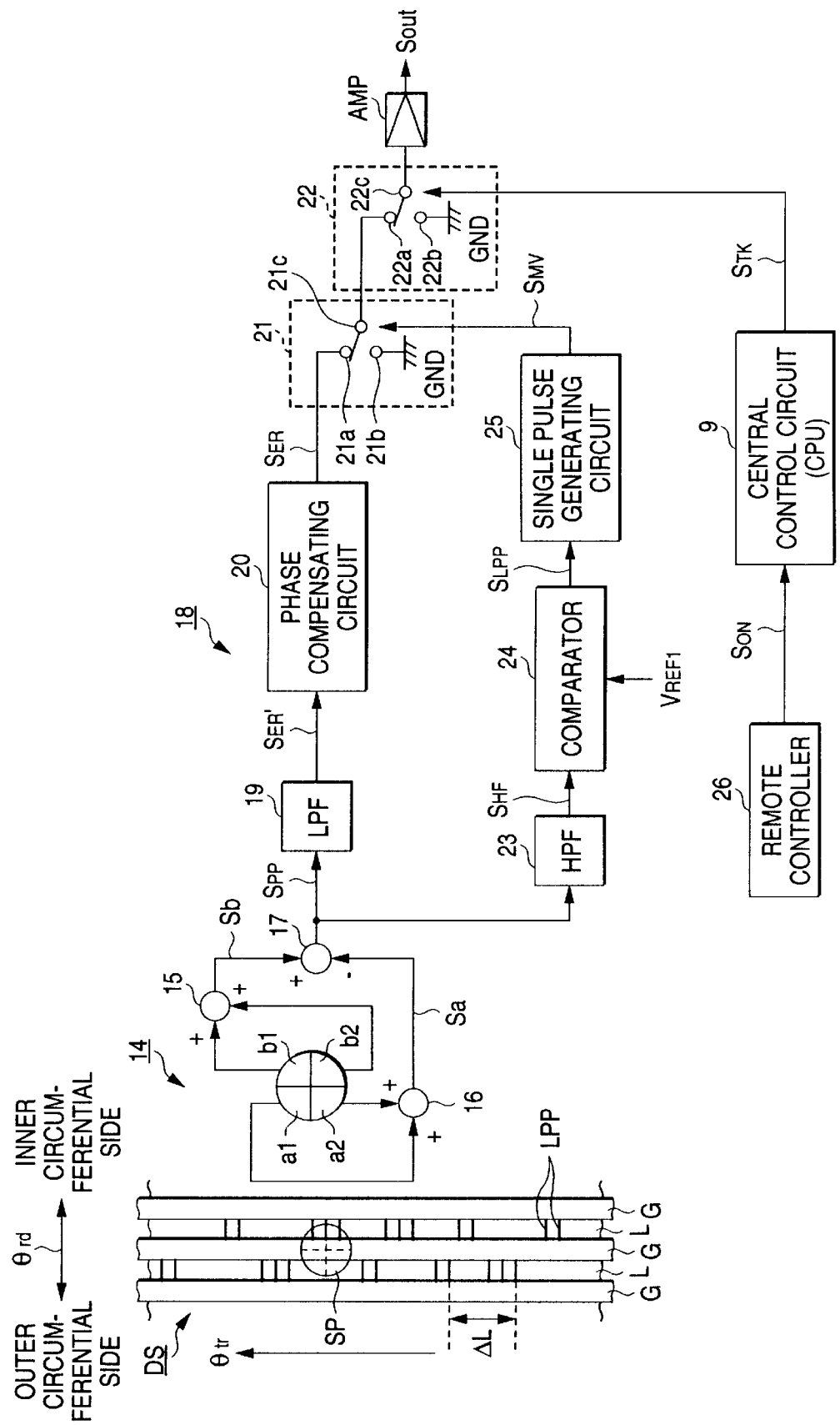
FIG. 3 is a block diagram showing an arrangement of a pickup drive apparatus according to the embodiment.

Referring now to the drawings, an embodiment of the resent invention will be described. It should be noted that FIG. 1 is a block diagram schematically showing an arrangement of a recording/reproducing apparatus according to the embodiment, FIGS. 2(a) and 2(b) are explanatory views showing a structure of an optical disk, and FIG. 3 is a block diagram showing an arrangement of a pickup drive apparatus according to the embodiment.

Figure 1:
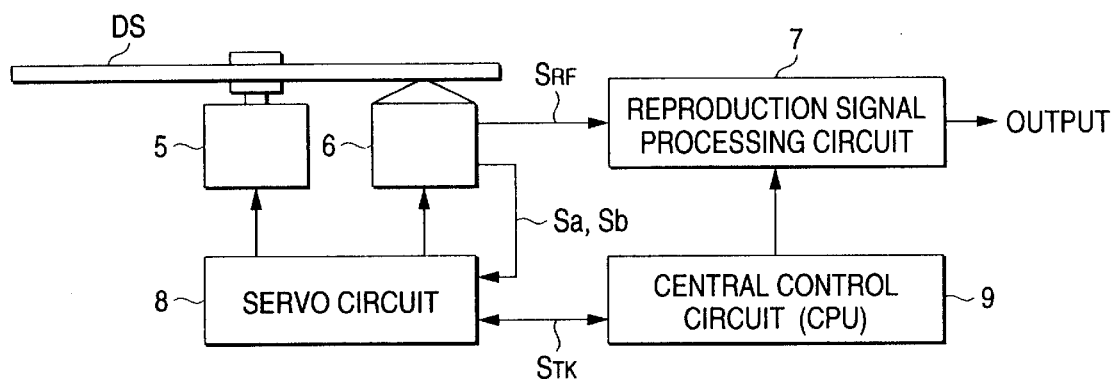
FIG. 1 is a block diagram schematically showing an arrangement of a recording/reproducing apparatus according to an embodiment of the present invention.

In FIG. 1, the present recording/reproducing apparatus is provided with a spindle motor 5 and a pickup 6. The spindle motor 5 holds an optical disk DS and rotates this optical disk DS at a constant linear velocity "$V_L$", or a constant angular velocity. The pickup 6 irradiates an optical spot SP onto the optical disk DS. A photodetector 14 is built in this pickup 6, and detects return light which is diffracted by optical disk DS by irradiating the optical spot SP.

This recording/reproducing apparatus is further arranged by a reproduction signal processing circuit 7, a servo circuit 8, and a central control circuit 9. The reproduction signal processing circuit 7 produces a reproduction signal based upon the detection signal outputted from the photodetector 14. The servo circuit 8 controls the rotation speed of the spindle motor 5 and also controls the positioning operation of the pickup 6 with respect to the optical disk DS in response to the detection signal. The central control circuit 9 controls overall operations of this recording/reproducing apparatus.

As indicated in a perspective view of FIG. 2(a), the optical disk DS is formed in such a manner that grooves "G" and lands "L" are previously formed as a continuous helical-shaped track around a so-called "clamping area (not shown)" provided at a rotation center of this optical disk DS, and intervals between the grooves G and the lands L along the radial direction "θrd" are set to a predetermined track pitch. In the lands L, land pre-pits LPP containing various sorts of information such as addresses are previously formed as a physical format.

Also, as indicated in a cross-sectional view of FIG. 2(b), the optical disk DS contains such a stacked layer structure formed by a recording layer 10, a reflection layer 11, a protection layer 12, and a transparent board 13. The optical spot SP is irradiated from the side of the transparent board 13 onto this optical disk DS. The recording layer 10 is used to record thereon the information, and is made of an organic color dye material and an inorganic metal. The reflection layer 11 is made of a material such as aluminum. These recording layer 10 and reflection layer 11 are sandwiched by the protection layer 12 and the transparent board 13. Also, since the optical spot SP is positioned onto the grooves G and is scanned along the track direction "θtr", the information is recorded, or reproduced on/from the optical disk DS.

Next, an arrangement of a pickup drive apparatus 18 will now be described with reference to FIG. 3. It should be noted that this pickup drive apparatus 18 is provided in the servo circuit 8.

In FIG. 3, a spot diameter of an optical spot SP irradiated onto an optical disk DS is set to be made slightly smaller than a track pitch. As a result, when the optical spot SP is scanned along the track direction "θtr" while being positioned onto the groove G, such return light containing both the information of the groove G and the information of the land pre-pit LPP is entered into the above-described photodetector 14 built in the pickup 6.

4 light receiving units a1, a2, b1, b2 are provided in the photodetector 14, and will receive the above-described return light while subdividing this return light into 4 light portions. The light receiving units a1 and a2 are arranged in correspondence with a half optical spot of the optical spot SP on the outer circumferential side of the radial direction "θrd", whereas the light receiving units b1 and b2 are arranged in correspondence with a half optical spot of the optical spot SP on the inner circumferential side of the radial direction "θrd".

An adder 15 and another adder 16 are connected to the output terminal of the photodetector 14. The adder 15 adds the detection signals outputted from the light receiving units b1 and b2 to each other to thereby output an addition signal Sb. The adder 16 adds the detection signals outputted from the light receiving units a1 and a2 to each other to thereby output another addition signal Sa. These addition signals Sa and Sb are supplied to a subtracter 17 provided in the pickup drive apparatus 18 so as to be subtraction-processed. As a result, a push-pull signal $S_{PP}$ (=Sb−Sa) is produced and indicates a position of the optical spot SP in the radial direction "θrd."

Although not shown in this drawing, the addition signal Sa is added to the addition signal Sb so as to produce an RF signal "$S_{RF}$ (=Sa+Sb)", and then this RF signal $S_{RF}$ is supplied to the reproduction signal processing circuit 7 by which a reproduction signal such as an audio signal and a video signal may be produced based on this RF signal $S_{RF}$.

In addition to the above-described subtracter 17, this pickup drive apparatus 18 is arranged by employing a low-pass filter 19, a phase compensating circuit 20, switching circuits 21, 22, a high-pass filter 23, a comparator 24, and also a single pulse generating circuit 25.

The low-pass filter 19 is set to a predetermined high cut off frequency. Then, this low-pass filter 19 removes a noise component which may be contained in the push-pull signal $S_{PP}$ when the pickup 6 is moved along the radial direction θrd. Also, this low-pass filter 19 produces a tracking error signal "$S_{ER'}$" to output this tracking error signal therefrom. The tracking error signal $S_{ER'}$ indicates a shift (deviation) amount of the optical spot SP from such a condition that the optical spot SP is positioned on the groove G (on-track state).

The phase compensating circuit 20 executes a predetermined phase compensation with respect to the tracking error signal $S_{ER'}$ produced from the low-pass filter 19, so that such a tracking error signal "$S_{ER}$" is outputted. Based upon this tracking error signal $S_{ER}$, both the gain of the servo system and the phase relationship are adjusted so as to stabilize the operation.

In other words, both the low-pass filter 19 and the phase compensating circuit 20 will constitute a signal producing circuit for producing the tracking error signal $S_{ER}$ from the push-pull signal $S_{PP}$.

In the switching circuit 21, the tracking error signal $S_{ER}$ is supplied to one switching contact 21a, and the other switching contact 21b is connected to the ground GND of this pickup drive apparatus. The switching circuit 21 performs the switching operation under a quasi-ON/OFF control signal "$S_{MV}$" supplied from the single pulse generating circuit 25, so that either the tracking error signal $S_{ER}$ or the ground-leveled signal is outputted from an output contact 21c of this switching circuit 21.

The switching circuit 22 owns a switching contact 22a connected to the output contact 21c of the switching circuit 21, and another switching contact 22b connected to the ground GND. This switching circuit 22 performs the switching operation under a track ON signal "$S_{TK}$" supplied from the central control circuit 9, so that either the signal derived from the switching circuit 21 or the ground-leveled signal is outputted from the output contact 22c. Then, the signal appearing at the output contact 22c is outputted via an inverting amplifier AMP to produce an output signal "Sout". In response to this output signal Sout, a control circuit (not shown) with employment of the PID control rule servo-controls an actuator for actuating the pickup 6.

The high-pass filter 23 is set to a predetermined low cut-off frequency. As a result, the high-pass filter 23 removes such a low frequency component which may be contained in the push-pull signal $S_{PP}$ when the pickup 6 its moved along the radial direction θrd. In other words, the frequency component of the tracking error occurred in such a case that the optical spot SP is deviated from the center position of the groove G to be modulated may be removed. Then, a high frequency signal "$S_{HF}$" from which the frequency component of this tracking error has been removed is outputted to the comparator 24.

The comparator 24 compares a preset threshold value $V_{REF1}$ with an amplitude of the high frequency signal $S_{HF}$, and outputs such a binary signal $S_{LPP}$. That is, when the above-described amplitude is larger than the threshold value $V_{REF1}$, this binary signal SLPP becomes a logic level "H", whereas when this amplitude is smaller than the threshold value $V_{REF2}$, this binary signal $S_{LPP}$ becomes a logic level "L".

The single pulse generating circuit 25 is arranged by a mono-stable multivibrator having a predetermined time constant "τ", and the like. This single pulse generating circuit 25 outputs a rectangular-shaped quasi-ON/OFF control signal $S_{MV}$ which becomes a logic level "H" only during a predetermined time period in synchronism with a rising edge of the binary signal $S_{LPP}$. Then, in the time period during which the quasi-ON/OFF control signal So becomes the logic level "H", the contact 21a of the switching circuit 21 is connected to the contact 21c thereof. In the time period during which the quasi-ON/OFF control signal $S_{MV}$ becomes the logic level "L", the contact 21b of the switching circuit 21 is connected to the contact 21c thereof.

In other words, the high-pass filter 23, the comparator 24, and the single pulse generating circuit 25 will constitute a signal producing circuit for producing the quasi-ON/OFF control signal $S_{MV}$ from the push-pull signal $S_{PP}$. Both the first and second switching circuits 21 and 22 will constitute a supply circuit for switching the tracking error signal $S_{ER}$ under control of the quasi-ON/OFF control signal $S_{MV}$ and the track ON signal $S_{TK}$ to thereby output this tracking error signal $S_{ER}$ to the control circuit side.

It should be noted that the above-described time constant "τ" set to the single pulse generating circuit 25 is set as follows: As indicated in FIG. 3, the land pre-pits LPPs are formed in a unit block of 3 bits on the optical disk DS, and the address information is set based on a state (logic 100, logic 111 etc.) of a 3-bit land pre-pit LPP in each of the unit blocks. Furthermore, the respective unit blocks are arranged in a constant interval "ΔL". Then, the time constant "τ" is set to be substantially equal to time required when the optical spot SP passes through such an interval of the adjoining unit blocks, namely the interval ΔL.

The central control circuit 9 is provided with a microprocessor (CPU) for executing a preset system program, and the like. This microprocessor controls the operation of this recording/reproducing apparatus.

In this case, in such a case that an operator and the like records, or reproduces the optical disk DS by using a remote controller 26, the central control circuit 9 outputs the track ON signal $S_{TK}$ having the logic level "H" upon receipt of this instruction so as to connect the contact 22a of the switching circuit 22 to the contact 22c thereof, so that the track capturing is carried out.

Also, when the operator performs music selecting operation, the pickup 6 is moved to the track where the music selection is performed. On this track, the central control circuit 9 supplies the track ON signal $S_{TK}$ having the logic level "H" to the switching circuit 22, so that the track capturing is performed. At this time, if the irradiation position of the optical spot SP is different from the address of the music selected by the operator, then the central control circuit 9 sets the logic level of the track ON signal $S_{TK}$ to another logic level "L", and further moves the pickup 6. Until the correct address is reached, the central control circuit 9 switches the switching circuit 22 in response to the track ON signal $S_{TK}$, so that the music selecting operation can be properly carried out.

When the contacts 21a, 21c, 22a, and 22c of the switch circuits 21 and 22 are connected to each other, the tracking error signal $S_{ER}$ derived from the phase compensating circuit 20 is outputted as an output signal "Sout". Since the central control circuit 9 controls an actuator (not shown) for driving the pickup 6 along the radial direction θrd in response to this output signal Sout, the servo control (track capturing) is carried out in such a manner that the optical pickup may be positioned to the center of the groove G.

Next, operations of the pickup drive apparatus having this arrangement will now be described with reference to FIG. 4 to FIG. 7.

Figure 4:
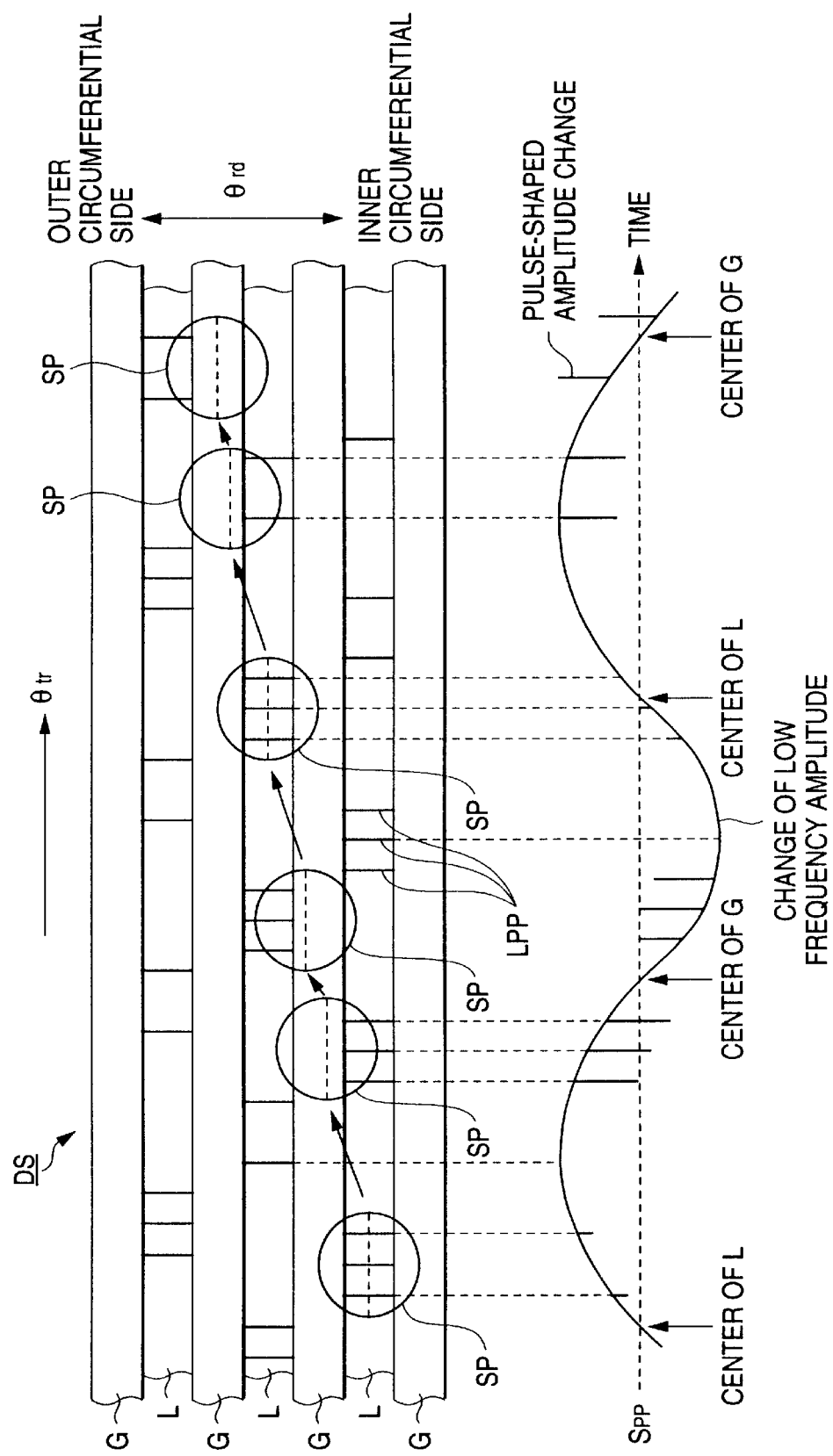
FIG. 4 is a waveform diagram for explaining operation of the pickup drive apparatus according to the embodiment.

First, a basic operation will now be described based on FIG. 4 and FIG. 5. In FIG. 4, while the optical disk DS is rotated at a predetermined linear velocity VI and the information is recorded, or reproduced by the pickup 6, when the irradiation position of the optical spot SP is relatively moved from the inner circumferential side to the outer circumferential side along the radial direction θrd with respect to the optical disk DS, the amplitude of the push-pull signal $S_{PP}$ produced by the subtracter 17 is changed in response to the diffraction light of the groove G and the land L. Furthermore, the amplitude of this push-pull signal $S_{PP}$ is also changed in response to the irradiation position of the optical spot SP with respect to the land pre-pit LPP.

As a consequence, the push-pull signal $S_{PP}$ owns such a waveform that the pulse-shaped amplitude containing the information of the land pre-pit LPP is superimposed on the amplitude having a relatively low frequency, which contains the information about the diffraction light between the groove G and the land L.

Furthermore, since the push-pull signal $S_{PP}$ is produced by the difference between the addition signal Sb and the addition signal Sa, when the optical spot SP is irradiated onto the center positions of the groove G and the land L, the amplitude of this push-pull signal $S_{PP}$ becomes zero. When the optical spot SP is irradiated at the intermediate position between the land L and the groove G, an absolute value of a low-frequency amplitude of this push-pull signal $S_{PP}$ becomes maximum. The addition signal Sb is produced based on the return light which is entered into the light receiving units b1 and b2 of the photodetector 14. The addition signal Sa is produced based upon the return light which is entered into the light receiving units a1 and a2. Also, the pulse-shaped amplitude changes will appear with opposite polarities when the land pre-pit LPP is positioned on the inner circumferential side, and also on the outer circumferential side with respect to the optical spot SP.

Similar to the above-described case of FIG. 4, when the irradiation position of the optical spot SP is relatively moved from the outer circumferential side to the inner circumferential side along the radial direction θrd with the optical disk DS, the amplitude of the push-pull signal $S_{PP}$ is changed in response to the change in the diffraction light at the groove G and the land L, or in accordance with the irradiation position of the optical spot SP with respect to the land pre-pit LPP.

Figure 5:
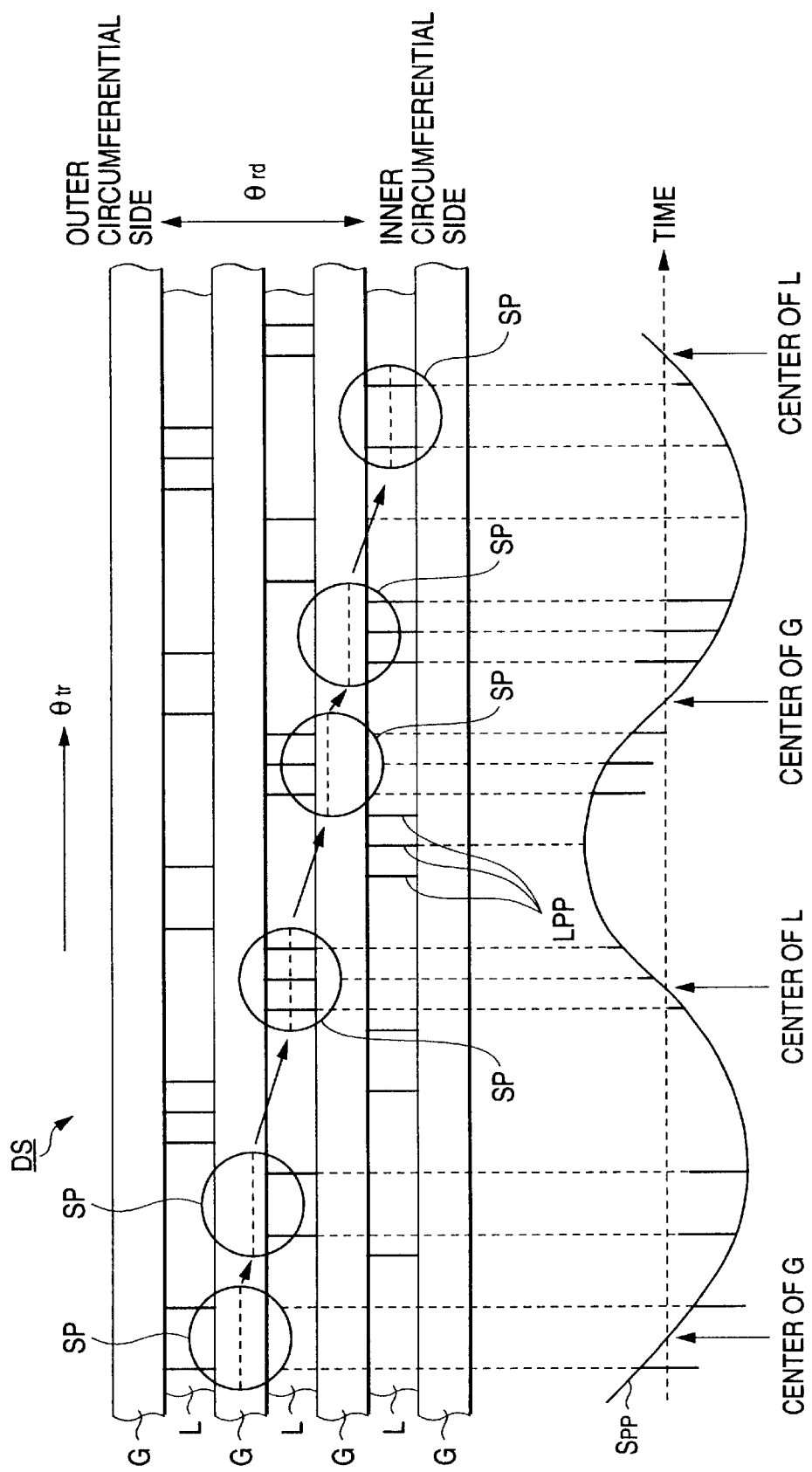
FIG. 5 is a waveform diagram for furthermore explaining the operation of the pickup drive apparatus according to the embodiment.

It should be understood that the amplitude change of the push-pull signal $S_{PP}$ shown in FIG. 4 and the amplitude change of the push-pull signal $S_{PP}$ shown in FIG. 5 own such waveforms shifted by a phase difference of 180° from each other. This is because the moving directions of the optical spots SPare opposite to each other, and further the grooves G and the lands L are arranged with maintaining the phase difference of 180°.

Furthermore, in such a case that the optical spot SP is moved in a swing manner which is like a reciprocation movement along the radial direction θrd, a push-pull signal $S_{PP}$ having such a waveform formed by combining the push-pull signals $S_{PP}$ with each other as shown in FIG. 4 and FIG. 5 is produced.

Figure 6:
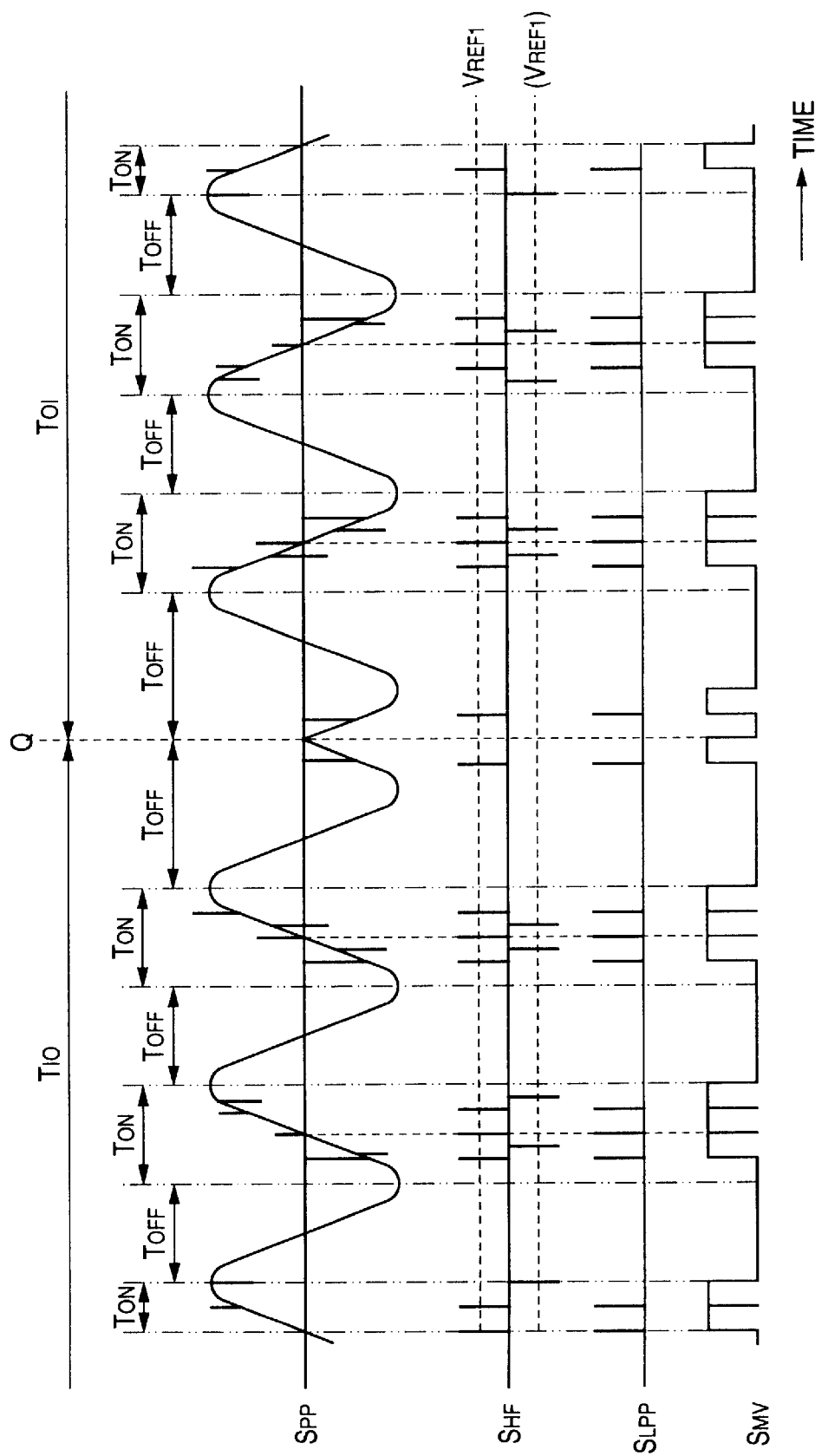
FIG. 6 is a waveform diagram for furthermore explaining the operation of the pickup drive apparatus according to the embodiment.

That is, as shown in FIG. 6, in a time period "$T_{IO}$" during which the optical spot SP is moved from the inner circumferential side to the outer circumferential side, and in another time period "$T_{OI}$" during which the optical spot SP is moved from the outer circumferential side to the inner circumferential side, the amplitude change in the push-pull signal $S_{PP}$ are shifted by a phase of 180° with respect to a boundary point corresponding to the inverting timing "Q" of the moving direction.

In general, the optical disk DS is not firmly clamped at a predetermined clamping position, but is clamped with being slightly deviated. As a result, the optical spot SP is moved along the radial direction θrd while being swung. As a consequence, the push-pull signal $S_{PP}$ shown in FIG. 6 represents a general state.

In FIG. 6, when such a push-pull signal $S_{PP}$ is filtered by the high-pass filter 23, the above-described low frequency component is removed, and the pulse-shaped high frequency signal $S_{HF}$ indicative of the component of the land pre-pit LPP is produced. Furthermore, since the high frequency signal $S_{HF}$ is entered into the comparator 24 so as to be compared with the threshold value VRU, the binary signal $S_{LPP}$ is produced. In synchronism with the rising edge of the binary signal $S_{LPP}$, the quasi-ON/OFF control signal $S_{MV}$ is outputted from the single pulse generating circuit 25. In addition, this quasi-ON/OFF control signal $S_{MV}$ is produced in a time period "$T_{ON}$" of an ON-track state where the major spot portion of the optical spot SP is irradiated on the groove G. However, this quasi-ON/OFF control signal $S_{MV}$ is not produced in a time period "$T_{OFF}$" of an OFF-track state where the major spot portion of the optical spot SP is irradiated on the land L, since the binary signal $S_{LPP}$ becomes smaller than the threshold value $V_{REFL1}$.

On the other hand, when the push-pull signal $S_{PP}$ is inputted to the low-pass filter 19 and the phase compensating circuit 20 shown in FIG. 3, the high frequency component corresponding to the land pre-pit LPP is removed by the low-pass filter 19, and then the tracking error signal $S_{ER}$ having the low frequency is produced which is equivalent to the change in the diffraction light on the groove G and the land L.

Figure 7:
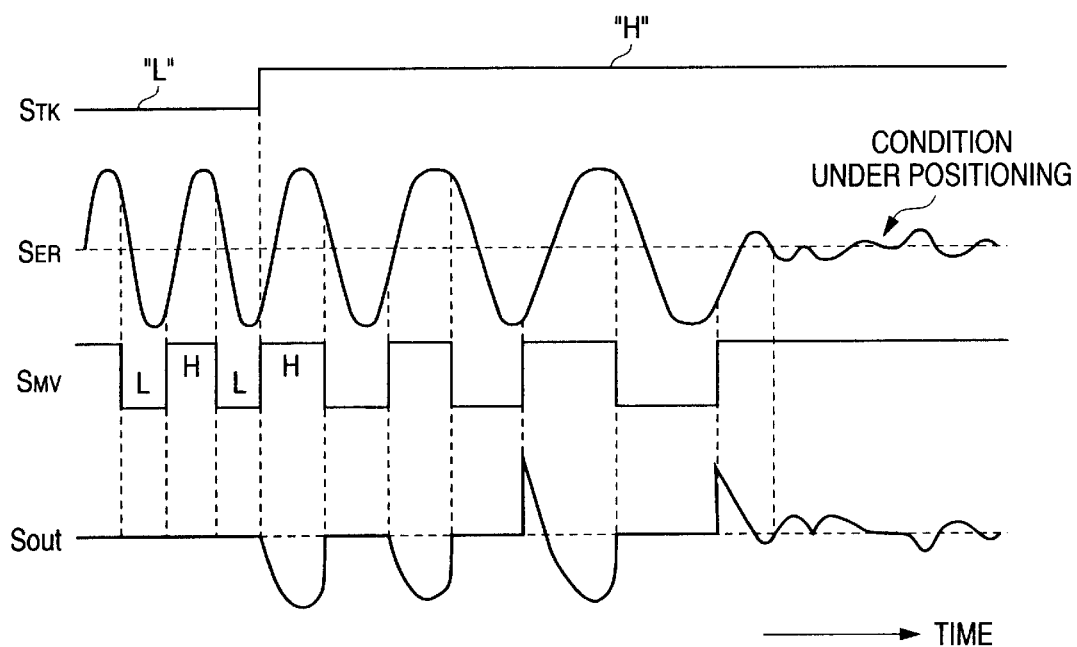
FIG. 7 is a waveform diagram for furthermore explaining the operation of the pickup drive apparatus according to the embodiment.

FIG. 7 shows a phase relationship between the quasi-ON/OFF control signal $S_{MV}$ and the tracking error signal $S_{ER}$. In FIG. 7, when the level of the quasi-ON/OFF control signal $S_{MW}$ becomes a logic level "L", the contact 21b of the switching circuit 21 is connected to the contact 21c thereof, and the level of the output signal Sout becomes the ground level. On the other hand, when the level of the quasi-ON/OFF control signal $S_{MV}$ becomes a logic level "H", the contact 21a of the switching circuit 21 is connected to the contact 21c thereof, and owns such a waveform that the tracking error signal $S_{ER}$ is cut out by the quasi-ON/OFF control signal $S_{MV}$.

Then, in response to the output signal Sout, the operation of the pickup 6 along the radial direction θrd is servo-controlled by the tracking servo control manner. As a consequence, the servo controls are carried out in such a manner. That is to say, the servo control of "track capturing" is carried out in such a way that the optical spot SP is positioned on the center of the groove G during the ON-track period $T_{ON}$. The servo control is stopped in order that no "track escaping" occurs in the OFF track period $T_{OFF}$.

As a consequence, the optical spot SP can be quickly positioned to the center of the groove G in high precision.

Also, when no instruction is issued by the remote controller 26, since the level of the track ON signal $S_{TK}$ becomes the logic level "L", the level of the output signal Sout becomes the ground level. To the contrary, when the instruction is issued by the remote controller 26, since the level of the track-ON signal $S_{TK}$ becomes the logic level "H", the output signal Sout is outputted in synchronism with the quasi-ON/OFF control signal $S_{MV}$. As a result, the tracking servo control is carried out based on the output signal Sout in response to the manipulation of the remote controller 26 by the user and the like.

As described above, in accordance with this embodiment, the land pre-pit LPP is optically detected, and the quasi-ON/OFF control signal $S_{MV}$ is produced based on this detection result. This quasi-ON/OFF control signal $S_{MV}$ indicates both the ON-track state and the OFF-track state of the optical spot SP with respect to the groove G and the land L. Furthermore, since the tracking servo control by the tracking error signal $S_{ER}$ is carried out under ON-track state based on the quasi-ON/OFF control signal $S_{MV}$, the optical spot SP can be positioned to the groove G in high precision.

In particular, the quasi-ON/OFF control signal $S_{MV}$ is not produced based upon the contract difference between the groove G and the land L, contrary to the conventional apparatus. Since this quasi-ON/OFF control signal $S_{MV}$ is produced based on the detection result of the land pre-pit L, there is such a superiors advantage that the optical spot SP can be positioned in high precision with respect to the unrecorded grooves G on which the information has not yet been recorded.

It should also be noted that as indicated in FIG. 6, the binary signal $S_{LPP}$ is produced by comparing the pulse waveform on the positive polarity side contained in the high frequency signal $S_{HF}$ with the positive threshold value $V_{REF1}$ in the comparator 24 in the above description. Alternatively, the binary signal $S_{LPP}$ may be produced by comparing a pulse waveform on a negative polarity side containing the high frequency signal $S_{HF}$ with a negative threshold value ($V_{FER1}$). Then, the quasi-ON/OFF control signal $S_{MV}$ may be produced by the single pulse generator 25 in synchronism with this binary signal $S_{LPP}$.

Also, two binary signals $S_{LPP}$ may be produced based on both the positive and negative threshold values $V_{REF1}$ and ($V_{REF1}$). Then, the quasi-ON/OFF control signal $S_{MV}$ may be produced by the single pulse generator 25 based upon such a binary signal obtained by OR-gating these two binary signals $S_{LPP}$.

Next, modifications related to this embodiment will now be described with reference to FIG. 8 to FIG. 14(b). It should be understood that the same reference numerals shown in FIG. 1 to FIG. 7 will be employed as those for denoting the same, or similar elements shown in FIG. 8 to FIG. 14(b).

(Modification 1)

Figure 8:
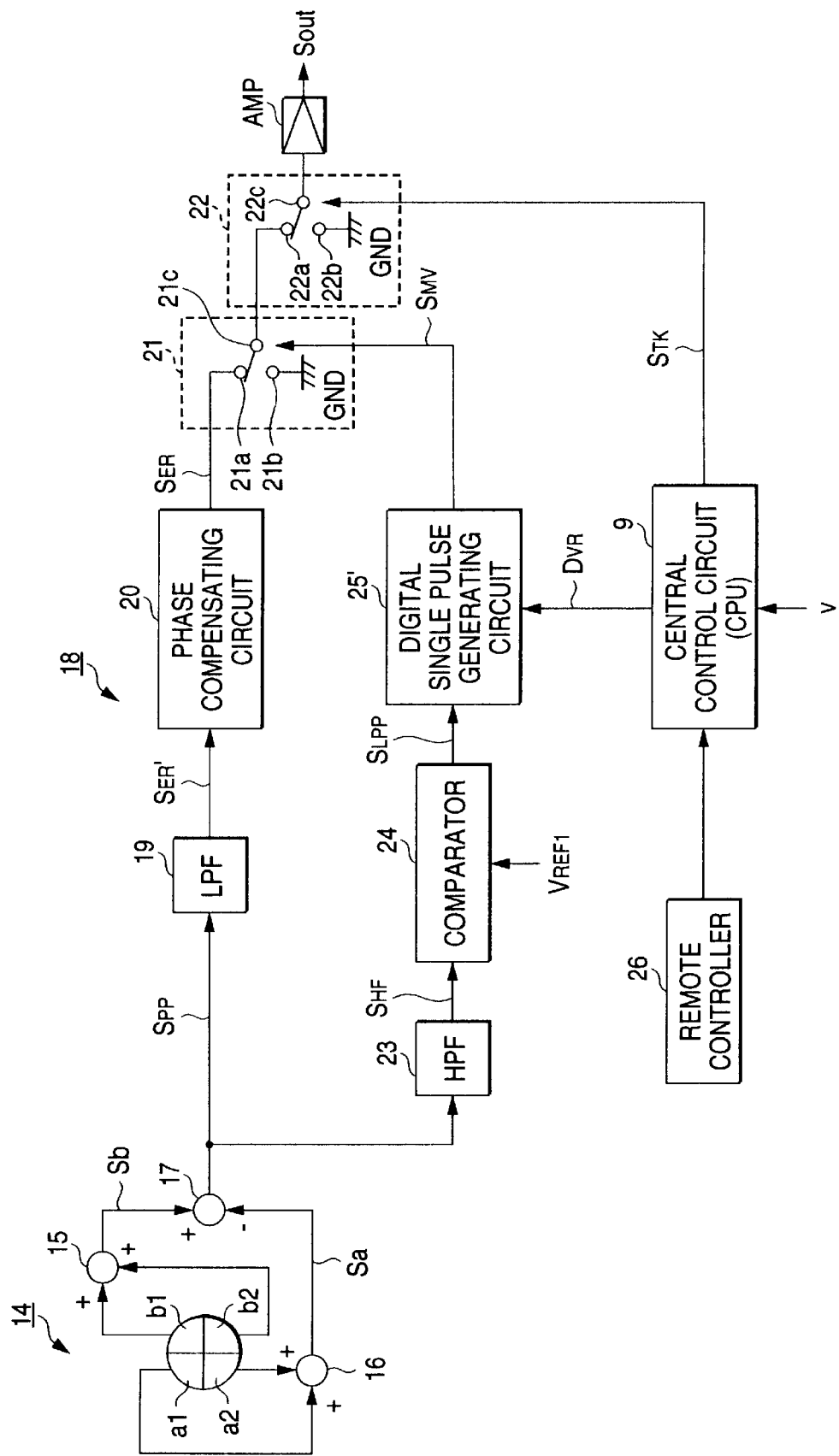
FIG. 8 is a block diagram showing an arrangement of a first modification of the pickup drive apparatus according to the embodiment.

In a first modification shown in FIG. 8, a digital single pulse generating circuit 25' capable of adjusting the time constant "τ" is provided instead of the single pulse generating circuit 25 shown in FIG. 3. Furthermore, the central control circuit 9 sequentially detects the actual rotation number "v" of the spindle motor (see FIG. 1) which rotates the optical disk DS, and also detects and/or predicts a reproduction radius "r".

Then, this modification is so arranged that a linear velocity $V_L$ is calculated from both the rotation number "v" and the reproduction radius "r", and control data $D_{VR}$ indicative of the time constant "τ" in correspondence with this linear velocity $V_L$ is supplied to the digital single pulse generating circuit 25'. In this case, such an adjustment is carried out as follows: Now, when the linear velocity $V_L$ is high, this time constant τ is decreased in response to this high linear velocity, whereas when the linear velocity $V_L$ is low, this time constant I is increased in response to this low linear velocity. It should be noted that the reproduction radium "r" implies a distance from a so-called "inner lead side" up to an irradiation position of the optical spot SP along the radial direction θrd. Instead of this reproduction radius "r", the linear velocity $V_L$ may be calculated based upon information about a reproduced address.

Also, although not shown in the drawings, the digital single pulse generating circuit 25' is arranged by a presettable register capable of storing thereinto the control data $D_{VR}$; a counter; a logic circuit; and so on. The counter commences (restarts) the counting operation in synchronism with the rising edge of the binary signal $S_{LPP}$ derived from the comparator 24, and stops (resets) this counting operation when the counted value becomes equal to the data stored in this presettable register. The logic circuit outputs the quasi-ON/OFF control signal $S_{MW}$ having the logic level "H" only in a time period during which this counter executes the above-described counting operation.

With employment of this circuit arrangement, the following effects can be achieved. In this recording/reproducing apparatus for rotating the optical disk DS in a constant linear velocity $V_L$, or a constant angular velocity, the rotation number "v" of the spindle motor 5 is varied in the case that the pickup 6 is scanned on the inner circumference side of the optical disk DS, and also scanned on the outer circumference side thereof. When both the reproduction radius "r" and the rotation number "v" are deviated from the defined states, the generating frequency of the binary signal $S_{LPP}$ is changed in connection with this deviation state. However, the abovedescribed time constant "τ" is automatically adjusted in such a manner that this time constant is substantially inverse proportion to the reproduced linear velocity $V_L$ in response to the change in the generating frequency of the binary signal $S_{LPP}$. As a result, the tracking servo control is continuously carried out in fit to the linear velocity $V_L$, and therefore, the positioning operation of the optical spot SP with respect to the groove G can be controlled in high precision in accordance with the actual case.

Also, similar to the presently popularized double-speed CD-ROM drive, this first modification may be employed in such a case that an optical disk of a CLV system is recorded, or reproduced by being rotated in a constant angular velocity. In other words, since the optical disk of the CLV system is rotated in a constant angular speed, the generating frequencies of the binary signals $S_{LPP}$ are changed in the cases of the inner circumferential side and the outer circumferential side. However, since the linear velocity $V_L$ is increased in accordance with the increase in the reproduction radius "r", the linear velocity $V_L$ may be calculated by employing the reproduction radius "r", and the time constant "τ" may automatically calculated in such a way that this time constant "τ" is inverse proportion to the linear velocity $V_L$. As a consequence, even when the optical disk of the CLV system is rotated in a constant angular velocity, the tracking servo control can be continuously carried out in accordance with the above-described linear velocity. Thus, the positioning operation of the optical spot with respect to the groove G can be controlled in high precision.

(Modification 2)

Figure 9:
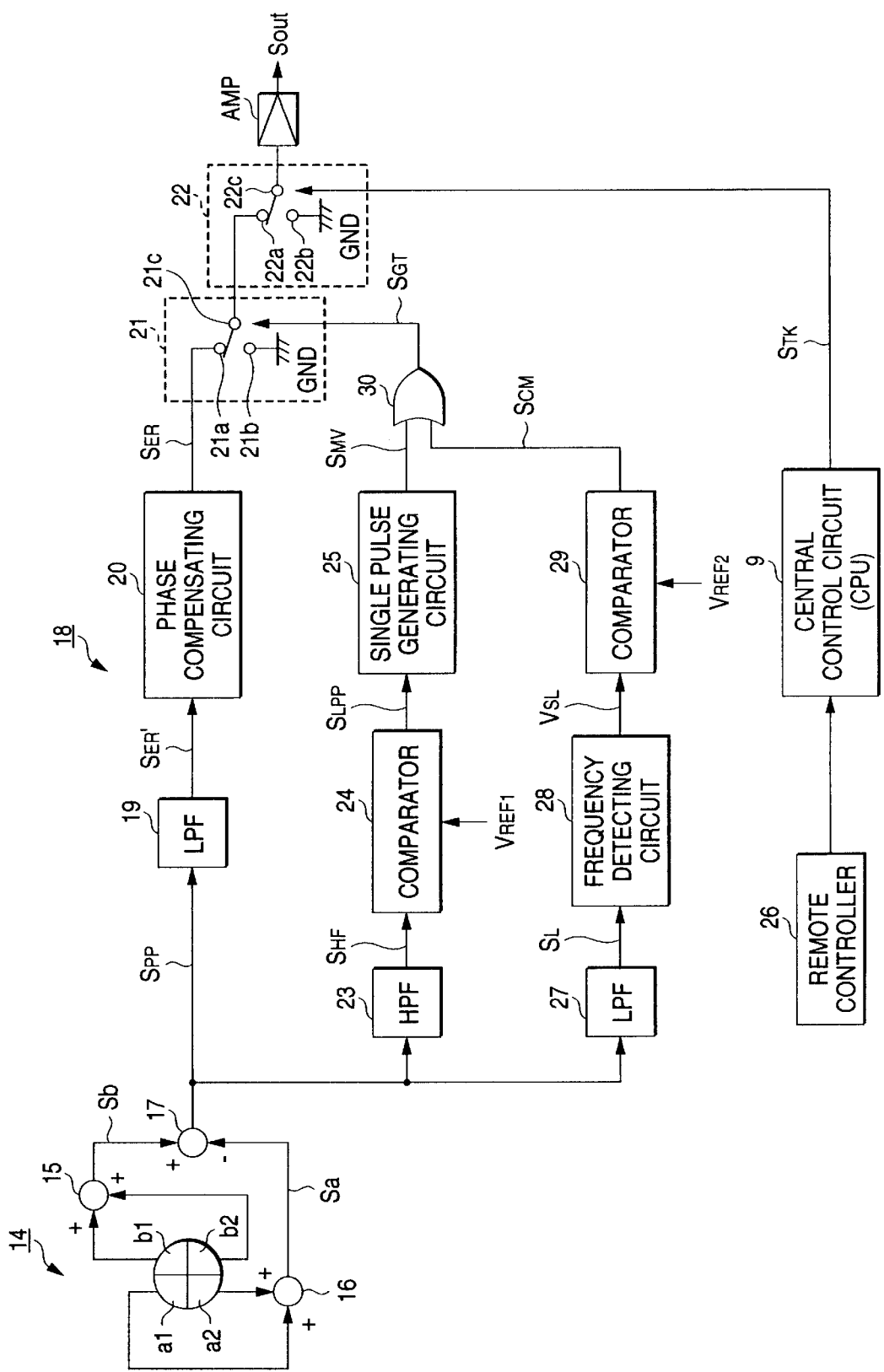
FIG. 9 is a block diagram showing an arrangement of a second modification of the pickup apparatus according to the embodiment.

Next, a second modification will now be described with reference to FIG. 9 and FIG. 10. In FIG. 9, a different point between the arrangement of FIG. 3 and this modification will now be described as follows: The second modification is constructed of a low-pass filter 27, a frequency detecting circuit 28, a comparator 29, and an OR gate 30. The low-pass filter 27 removes the high frequency component of the land pre-pit LPP contained in the push-pull signal $S_{PP}$. The frequency detecting circuit 28 detects the frequency of the signal $S_L$ having the low frequency component, which is outputted from the low-pass filter 27, and then outputs a voltage "$V_{SL}$" direct proportion to this detected frequency. The comparator 29 compares the output voltage $V_{SL}$ of the frequency detecting circuit 28 with a predetermined threshold value "$V_{REF2}$".

Then, when the output voltage $V_{SL}$ is higher than the threshold value $V_{REF2}$, a judgement signal $S_{CM}$ having a logic level "H" is outputted from the comparator 29. Also, when the output voltage $V_{SL}$ is lower than the threshold value $V_{REF2}$, a judgement signal $S_{CM}$ having a logic level "L" is outputted from the comparator 29.

The OR gate 30 OR-gates the judgement signal $S_{CM}$ and the quasi-ON/OFF control signal $S_{MV}$ supplied from the single pulse generating circuit 25 to thereby output such a gate signal $S_{GT}$ used to control the switching operation of the switching circuit 21.

Figure 10:
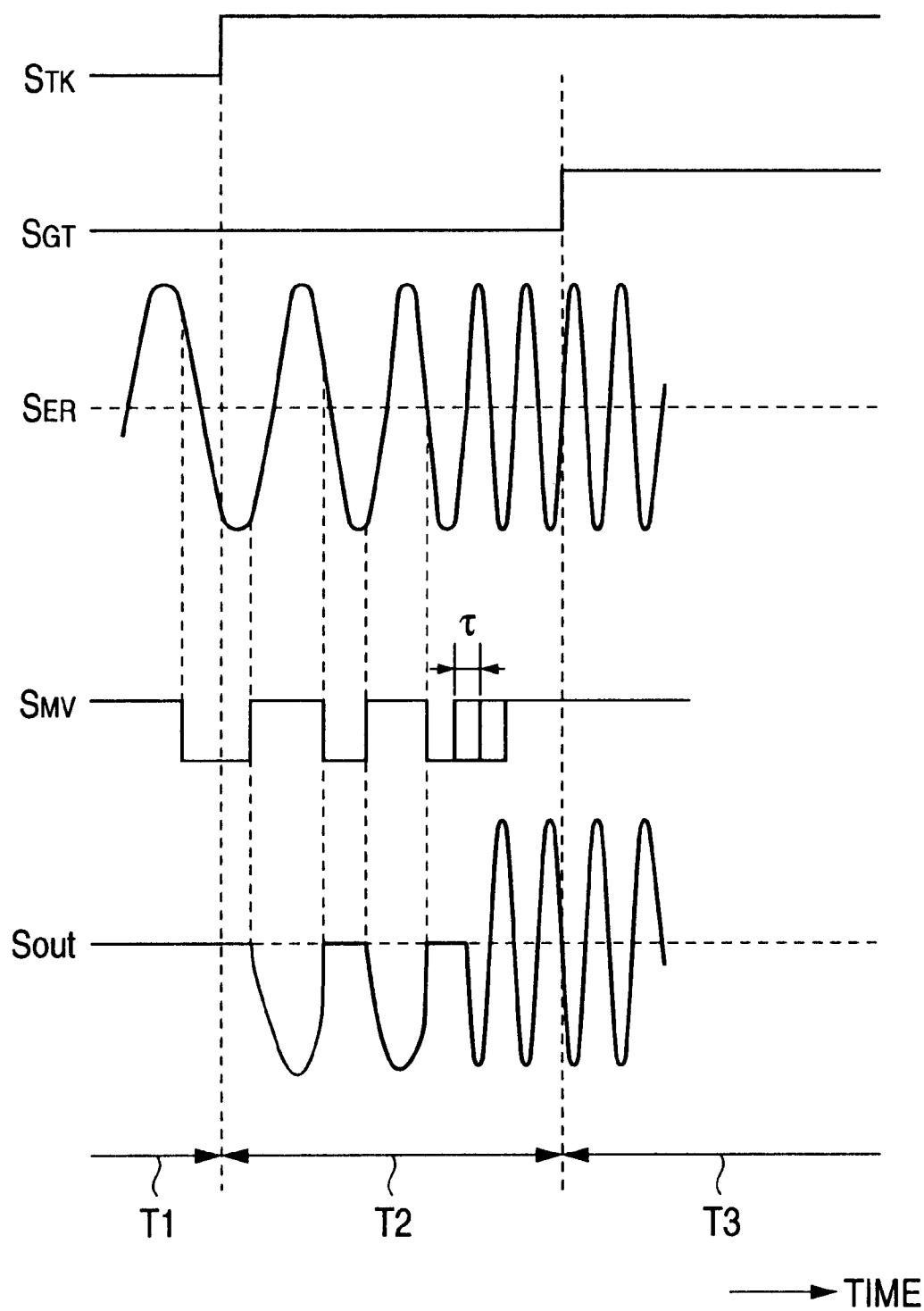
FIG. 10 is a waveform diagram for explaining operation of the second modification.

With employment of this circuit arrangement, as indicated in a waveform diagram of FIG. 10, the level of the output signal Sout becomes the ground level in a time period T1 during which no instruction is issued from the remote controller 26, so that the tracking servo control is not carried out. In such a time period T2 during which the instruction is issued by the remote controller 26, such a tracking error signal $S_{ER}$ is outputted as the output signal Sout in synchronism with the quasi-ON/OFF control signal $S_{MV}$. As a result, the tracking servo control is carried out. Furthermore, in such a case that the frequency "f" of the tracking error signal $S_{ER}$ is increased and then the time period 1/f thereof is made narrower than the pulsewidth "τ" of the quasi-ON/OFF control signal $S_{MV}$ (time period T3), the level of the gate signal $S_{GT}$ becomes the logic level "H". As a result, the tracking error signal $S_{ER}$ is directly outputted as the output signal Sout.

The following assumption may be conceived. That is, while the tracking servo control is performed, if the control operation for "track capturing" is brought into a fail condition, then such a condition will occur that the time period 1/f of this tracking error signal $S_{ER}$ becomes narrower than the pulse width "τ" of the quasi-ON/OFF control signal $S_{MV}$. Accordingly, the waveform of this quasi-ON/OFF control signal $S_{MV}$ is disturbed, so that unstable conditions may be conducted, for example, the servo system will be oscillated.

However, in accordance with this second modification, the process operation by using the quasi-ON/OFF control signal $S_{MV}$ is stopped before the above-described unstable condition is conducted. In this stop period T3, the tracking error signal $S_{ER}$ is directly outputted as the output signal Sout to perform the tracking servo control. As a result, the servo system can be stabilized, and therefore, the highly reliable tracking servo control can be firmly carried out.

(Modification 3)

Figure 11:
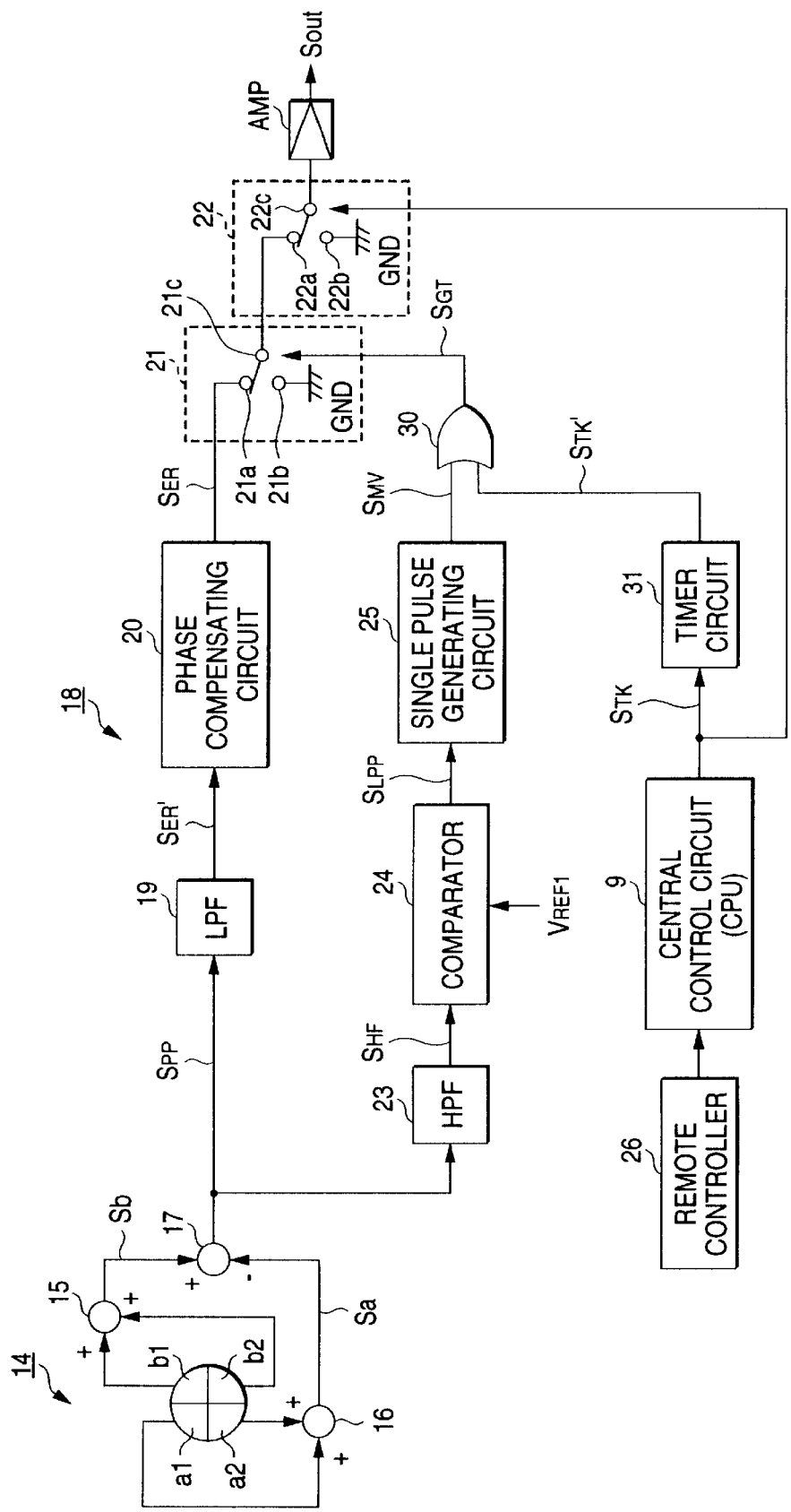
FIG. 11 is a block diagram showing an arrangement of a third modification of the pickup drive apparatus according to the embodiment.
Figure 12:
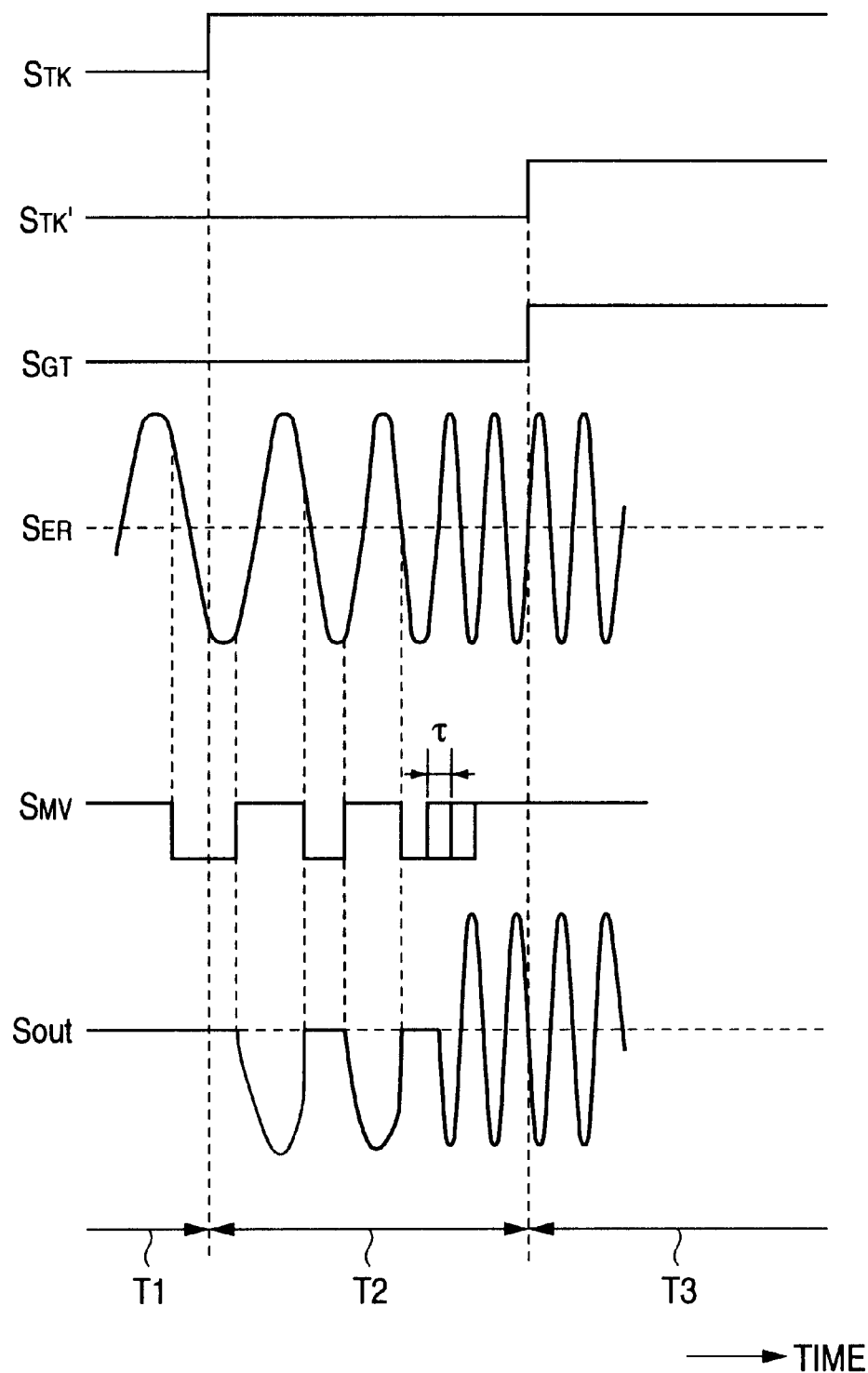
FIG. 12 is a waveform diagram for explaining operation of the third modification.

Referring now to FIG. 11 and FIG. 12, a third modification will be described. It should be understood that FIG. 12 is a waveform diagram shown in correspondence with FIG. 10. Also, this third modification corresponds to the further modified second modification.

In FIG. 11, this third modification is arranged by employing a timer circuit 31 functioning as a time setting means, and also by entering a delayed track-ON signal $S_{TK}$ into an OR gate 30. The timer circuit 31 delays a track-ON signal $S_{TK}$ outputted from the central control circuit 9 by a predetermined constant time.

With employment of this circuit arrangement, as indicated in the waveform diagram of FIG. 12, the switching circuit 21 is controlled based on the quasi-ON/OFF control signal $S_{MV}$ in a time period T2 during which the level of the track-ON signal $S_{TK}$ becomes the logic level "L", whereas the control operation of the switching circuit 21 by the quasi-ON/OFF control signal $S_{MV}$ is forcibly prohibited in a time period T3 during which the level of the track-ON signal $S_{TK}$ becomes the logic level "H".

Then, generally speaking, when the tracking servo control is carried out with respect to the pickup 6, the positioning control of the optical spot SP with respect to the groove G is converged and is stabilized in a constant time. As a result, since the time duration until the positioning control of the optical spot SP can become stable is set as the delay time of the timer circuit 31, the highly reliable tracking servo control can be firmly carried out in a similar manner to that of the second modification.

Also, in accordance with the third modification, there is such an effect that the circuit arrangement thereof can be made simpler than that of the second modification.

(Modification 4)

Figure 13:
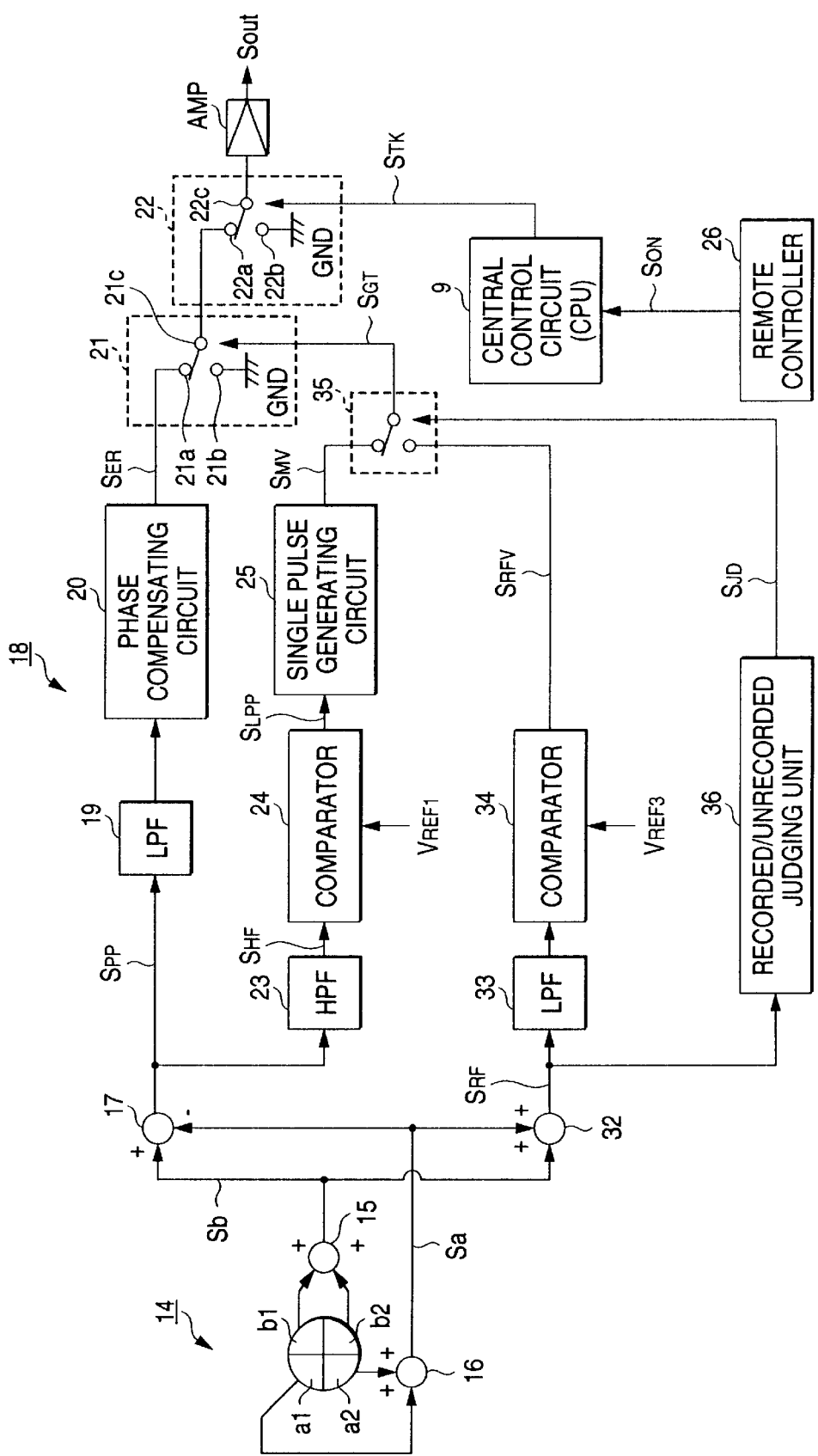
FIG. 13 is a block diagram showing an arrangement of a fourth modification of the pickup drive apparatus according to the embodiment.
Figure 14:
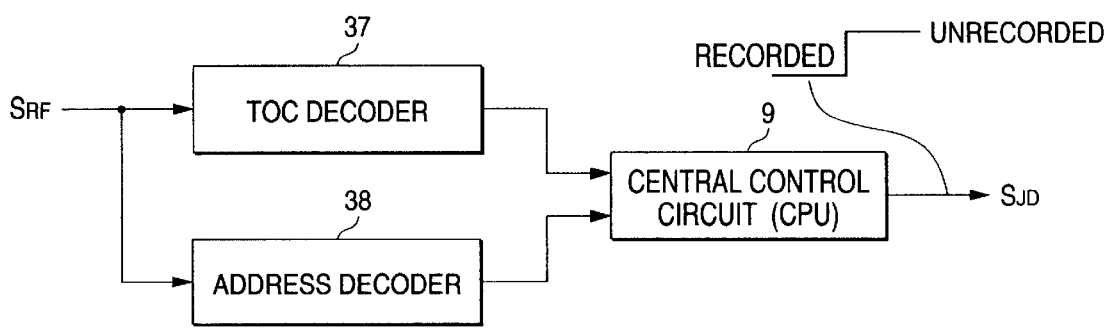
FIG. 14(a) is a block diagram showing an example of a concrete arrangement of a recorded/unrecorded judging unit shown in FIG. 13.
FIG. 14(b) is a block diagram showing another example of the same.
Figure 14:
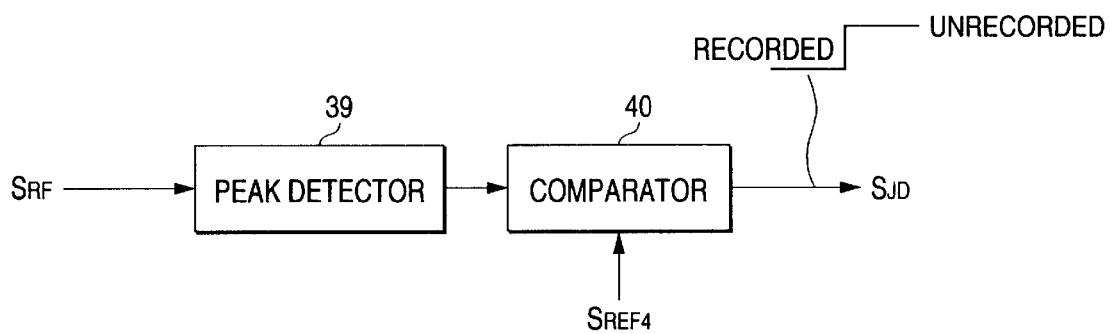

Next, a fourth modification will now be described with reference to FIG. 13 and FIGS. 14(a) and 14(b). In FIG. 13, this fourth modification is provided with an adder 32, a low-pass filter 32, and a comparator 34. The adder 32 adds the signals Sa and Sb outputted from the adders 15 and 16 to each other to thereby produce the RF signal $S_{RF}$. The low-pass filter 33 removes a component (namely high frequency component) of a land pre-pit LPP contained in the RF signal $S_{RF}$. The comparator 34 compares the signal containing the low frequency component outputted from the low-pass filter 33 with a predetermined threshold value $V_{REF3}$ to thereby produce a binary signal $S_{RFV}$. This fourth modification is further arranged by a recorded/unrecorded judging unit 36 and a switching circuit 35. The recorded/unrecorded judging unit 36 judges as to whether the optical spot SP is irradiated onto any one of an unrecorded groove G and a recorded groove G based upon the RF signal $S_{RF}$. The switching circuit 35 executes the switching operation in response to a judgement signal $S_{JD}$ outputted from the recorded/unrecorded judging unit 36.

Figure 15:
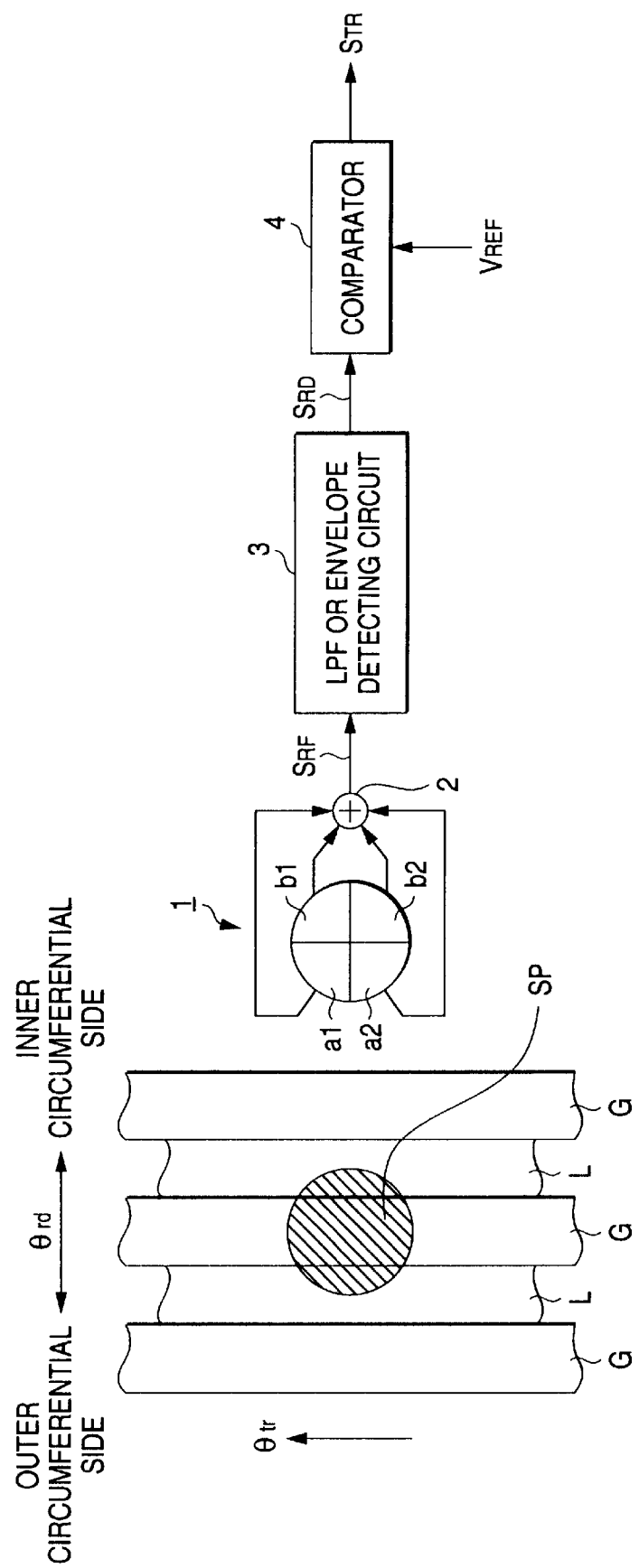
FIG. 15 is a block diagram showing an arrangement of a conventional pickup drive apparatus.
Figure 16:
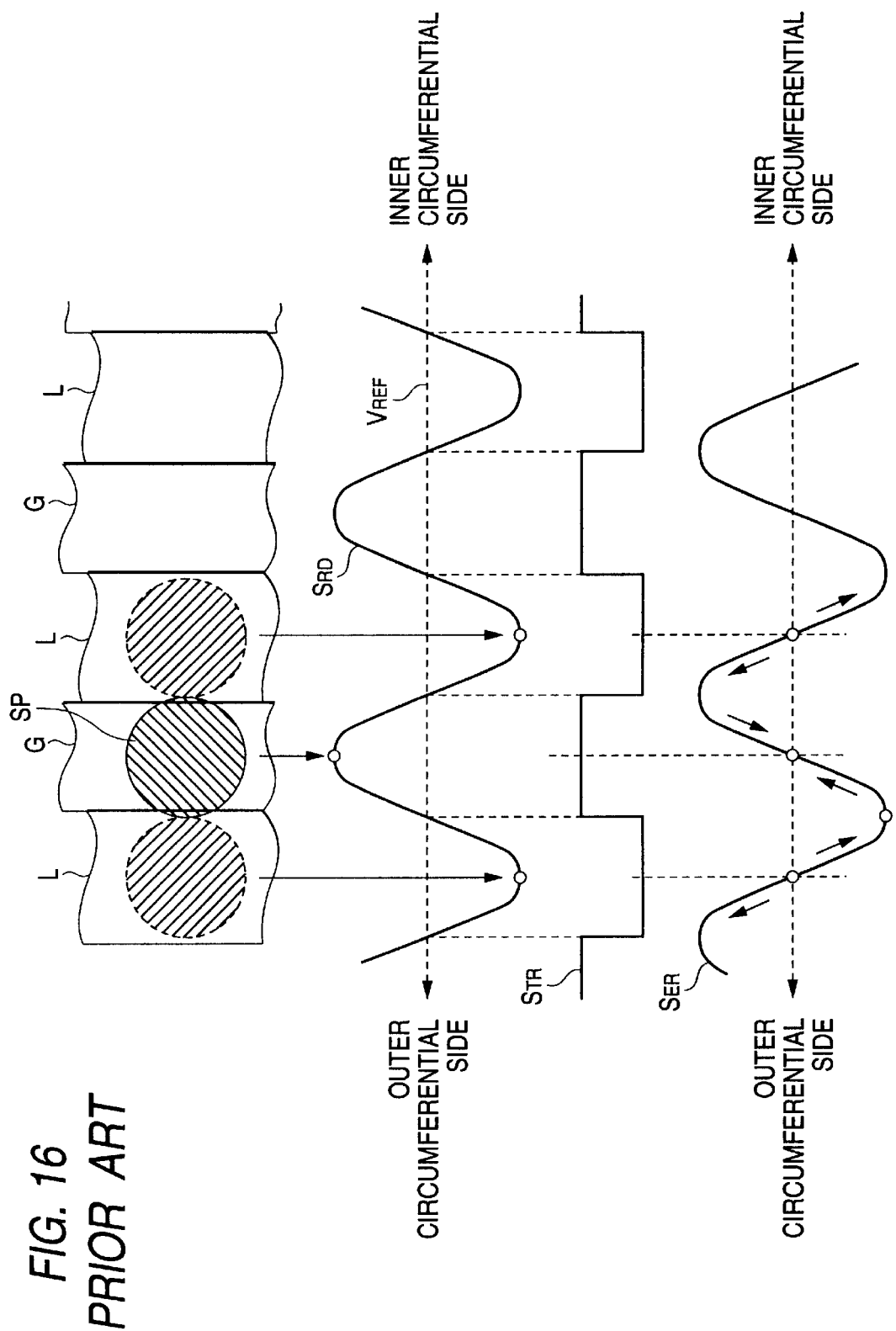
FIG. 16 is an explanatory diagram for explaining the operation of the conventional pickup drive apparatus.

In this case, the signal having the low frequency derived from the low-pass filter 33 owns a similar waveform to that of a radial contrast signal $S_{RD}$ shown in FIG. 15 in the recorded region. Also, the threshold value $V_{REF3}$ set to the comparator 34 is set in such a manner that when the low frequency signal becomes a positive value, this low frequency signal can be detected. As a result, the binary signal $S_{RFV}$ outputted from the comparator 34 owns a similar waveform to that of an ON/OFF track signal $S_{TR}$ shown in FIG. 15.

The recorded/unrecorded judging unit 36 owns such an arrangement as indicated in FIG. 14(a), or FIG. 14(b). In the circuit arrangement of FIG. 14(a), a TOC decoder circuit 37 and an address decoder circuit 38 are employed. The TOC decoder circuit 37 detects TOC information (Table of Contents information) prerecorded on the optical disk DS based upon the RF signal $S_{RF}$. The TOC decoder circuit 37 detects data of recorded groove G and data of unrecorded groove G from the TOC information, whereas the address decoder circuit 38 detects address data from the TOC information.

Then, since the data outputted from these decoder circuits 37 and 38 are supplied to the central control circuit 9, this central control circuit 9 judges the address of the recorded region and the address of the unrecorded region, and outputs such a judgement signal $S_{JD}$ having a logic level "L" when the pickup 6 is positioned at the unrecorded region, and further outputs such a judgement signal $S_{JD}$ having a logic level "H" when the pickup 6 is positioned at the unrecorded position during the tracking servo control.

It should be noted that this judgement process operation by the central control circuit 9 is carried out by executing a preset system program by a microprocessor.

With employment of this circuit arrangement, in a time period when the level of the judgement signal $S_{JD}$ becomes the logic level "H", namely when the pickup 6 is located at the unrecorded region, the switching circuit 35 is switched as shown in FIG. 13. As a result, since the quasi-ON/OFF control signal S is supplied as the gate signal $S_{GT}$ to the switching circuit 21, while the tracking error signal $S_{ER}$ in synchronism with the quasi-ON/OFF control signal $S_{MV}$ is used as the output signal Sout, the tracking servo control is carried out. As a consequence, the optical spot SP can be positioned in high precision with respect to the unrecorded groove G.

To the contrary, in a time period when the level of the judgement signal $S_{JD}$ becomes the logic level "L", namely when the pickup 6 is located at the recorded region, the switching circuit 35 is switched to the contact of the side of the comparator 34. As a result, the binary signal $S_{RFV}$ is supplied as the gate signal $S_{GT}$ to the switching circuit 21.

As a consequence, while the tracking error signal $S_{ER}$ is produced in synchronism with the binary signal $S_{REV}$ as the output signal Sout, the tracking servo control is carried out. In other words, since there is a clear difference between the contrast of the recorded groove G and the contrast of the land L, when the pickup 6 is located at the recorded region, the output timing of the tracking error signal $S_{ER}$ is controlled based on the binary signal $S_{RFV}$, so that the positioning operation of the optical spot SP with respect to the recorded groove G can be carried out in high precision.

On the other hand, in the circuit arrangement shown in FIG. 14(b), this modification is provided with a peak detector 39, and another comparator 40. The peak detector 39 detects a peak of an amplitude of an RF signal $S_{RF}$. The comparator 40 compares this peak detection result with a predetermined threshold value $V_{REF4}$, and outputs a judgement signal $S_{JD}$ having a logic level "L" in the case that the detection result is larger than the threshold value $V_{REF4}$.

With employment of this circuit arrangement, when the optical spot SP is positioned on the recorded region, the level of the judgement signal $S_{JD}$ becomes the logic "L", whereas when the optical spot SP is positioned on the unrecorded region, the level of the judgement signal $S_{JD}$ becomes the logic level "H". Accordingly, a tracking servo control is carried out in a similar manner to that shown in FIG. 14(a).

As described above, in accordance with this embodiment, since the optical spot SP can be positioned with respect to the unrecorded groove G, this inventive idea is applicable to a write-once type CD-R or DVD-R, as well as an information rewritable CD-RW or DVD-RW, resulting in superior effects. It should also be noted that when a reproduction-only CD-R or DVD-R is employed, a high-precision tracking servo control can be apparently carried out.

Further, it should be understood that the present embodiment shown in FIG. 3 and the above-described modifications are merely indicated as the basic arrangements so as to describe the present invention. As a consequence, the pickup drive apparatuses constituted by properly combining the embodiment with the relevant modifications can be involved by the present invention.

As described above, in accordance with the present invention, the tracking error signal indicative of the irradiation position of the optical spot and also the control signal corresponding to the component of the pre-pit are obtained based upon the return light from the recording medium, and the servo control is carried out by the tracking error signal in response to the control signal. As a result, the servo control for positioning the optical spot with respect to the groove can be realized.

In particular, since the control signal is produced based upon the detection result of the pre-pit, such a servo control can be realized in high precision, by which the optical spot can be positioned in even any of the recorded tracks and the unrecorded tracks.

What is claimed is:

1. A pickup drive apparatus for driving/controlling a pickup used to irradiate an optical spot on a recording medium having a pre-pit between tracks, which are continuous guide grooves, comprising,:
   light detecting means for detecting return light produced by irradiating the optical spot;
   first signal producing means for producing a tracking error signal based upon the detection output of said light detecting means;
   second signal producing means for detecting on/off-track using a component of the pre-pit included in the detection output of said light detecting means and producing a control signal corresponding to the component of the pre-pit based upon the detecting result regarding the on/off-track;
   control means for performing a tracking control in response to the tracking error signal; and
   supply means controlled to determine whether to supply the tracking error signal to said control means in response to the control signal.

2. A pickup drive apparatus for driving/controlling a pickup used to irradiate an optical spot on a recording medium having a pre-pit between tracks, comprising:
   light detecting means for detecting return light produced by irradiating the optical spot;
   first signal producing means for producing a tracking error signal based upon the detection output of said light detecting means;
   second signal producing means for producing a control signal corresponding to the component of the pre-pit based upon the detection output of said light detection means;
   control means for performing a tracking control in response to the tracking error signal; and
   supply means controlled to determine whether to supply the tracking error signal to said control means in response to the control signal;
   wherein said second signal producing means produces the control signal by expanding the component of the pre-pit by a predetermined time width, and said supply means switches when the control signal is input thereinto so as to supply the tracking error signal to said control means.

3. The pickup drive apparatus as claimed in claim 2, further comprising:
   drive means for rotating the recording medium at a predetermined speed;
   detecting means for detecting the rotation number of the recording medium by said drive means;
   recognizing means for recognizing a relative position of the optical spot along a radial direction of the recording medium; and
   variable means for calculating a linear velocity of the track with respect to the optical spot based upon the rotation number detected by said detecting means and the relative position recognized by said recognizing means, and for varying the time width of the control signal produced by said second signal producing means in response to the linear velocity.

4. The pickup drive apparatus as claimed in claim 2, wherein in the case that a time period of the tracking error signal is shorter than the time width of the control signal, said supply means supplies the tracking error signal to said control means irrespective of the control signal.

5. The pickup drive apparatus as claimed in claim 2, wherein after a predetermined time has elapsed since the tracking control is commenced, said supply means supplies the tracking error signal to said control means irrespective of the control signal.

6. The pickup drive apparatus as claimed in claim 2, further comprising:
   third signal producing means for producing a radial contrast signal in response to the detection output of said light detecting means; and
   judging means for judging a first case when the pickup is located on a track under recorded condition, and a second case when the pickup is located on a track under unrecorded condition in response to the detection output of said light output means,
   wherein when the judgement result of said judging means corresponds to the first case, said supply means supplies the tracking error signal to said control means in response to the radial contrast signal irrespective of the control signal.

7. A pickup drive method for driving/controlling a pickup used to irradiate an optical spot on a recording medium having a pre-pit between tracks, which are continuous guide grooves, comprising the steps of:
   detecting return light produced by irradiating the optical spot;
   producing a tracking error signal;
   detecting on/off-track using a component of the pre-pit included in the detection output of said light detecting means;
   producing a control signal corresponding to the component of the pre-pit based upon the the detecting result regarding the on/off-track; and
   turning the tracking error signal on or off in response to the control signal.

8. A recording/reproducing apparatus equipped with a pickup drive apparatus for driving/controlling a pickup used to irradiate an optical spot on a recording medium having a pre-pit between tracks, which are continuous guide grooves, wherein said pickup drive apparatus comprises:
   light detecting means for detecting return light produced by irradiating the optical spot;
   first signal producing means for producing a tracking error signal based upon the detection output of said light detecting means;
   second signal producing means for detecting on/off-track using a component of the pre-pit included in the detection output of said light detecting means and producing a control signal corresponding to the component of the pre-pit based upon the detecting result regarding the on/off track;
   control means for performing a tracking control in response to the tracking error signal; and supply means controlled to determine whether to supply the tracking error signal to said control means in response to the control signal.

9. A pickup drive apparatus for driving/controlling a pickup used to irradiate an optical spot on a recording medium having a pre-pit between tracks, which are continuous guide grooves, comprising:

a photodetector circuit;

a tracking error generating circuit that outputs a tracking error signal based on the output of said photodetector circuit;

a control generating circuit that detects on/off-track using a component of the pre-pit included in the output of said photodetector circuit and produces a control signal corresponding to the component of the pre-pit based on the detecting result regarding the on/off-track;

a control circuit that controls tracking in response to the tracking error signal; and a supply circuit that determines whether to output the tracking error signal to the control circuit based on the control signal.

* * * * *